(12) United States Patent
Rhyne et al.

(10) Patent No.: US 6,769,465 B2
(45) Date of Patent: Aug. 3, 2004

(54) STRUCTURALLY SUPPORTED RESILIENT TIRE

(75) Inventors: Timothy B. Rhyne, Greenville, SC (US); Kenneth W. DeMino, Anderson, SC (US); Steven M. Cron, Simpsonville, SC (US)

(73) Assignee: Michelin Recherche et Technique, S.A. (CH)

(*) Notice: Subject to any disclaimer, the term of this patent is extended or adjusted under 35 U.S.C. 154(b) by 262 days.

(21) Appl. No.: 10/081,571

(22) Filed: Feb. 22, 2002

(65) Prior Publication Data

US 2002/0124929 A1 Sep. 12, 2002

Related U.S. Application Data

(60) Provisional application No. PCT/US99/29366, filed on Dec. 10, 1999.

(51) Int. Cl.[7] .............................. B60C 7/00; B60C 9/18; B60C 13/00; B60C 30/00
(52) U.S. Cl. ....................... 152/197; 152/246; 152/327; 156/113
(58) Field of Search .................... 152/246, 300–303, 152/197, 323, 325, 327–329, 516; 156/112, 113

(56) References Cited

U.S. PATENT DOCUMENTS

| | | | |
|---|---|---|---|
| 1,440,974 A | | 1/1923 | Dornburgh |
| 2,650,633 A | * | 9/1953 | Eger ........................... 152/327 |
| 3,233,649 A | | 2/1966 | Jolivet et al. |
| 4,111,249 A | | 9/1978 | Markow |
| 4,170,254 A | | 10/1979 | Jackson |
| 4,241,775 A | | 12/1980 | Jackson |
| 4,425,953 A | | 1/1984 | Rohde et al. |
| 4,456,048 A | | 6/1984 | Markow et al. |
| 4,580,610 A | | 4/1986 | Jackson |
| 4,671,333 A | | 6/1987 | Rohde et al. |
| 4,934,428 A | | 6/1990 | Aoki et al. |
| 5,164,028 A | | 11/1992 | Uemura |
| 5,201,971 A | | 4/1993 | Gifford |
| 6,167,931 B1 | * | 1/2001 | Hsiao ........................ 152/197 |
| 6,640,859 B1 | * | 11/2003 | Laurent et al. ......... 152/246 X |

FOREIGN PATENT DOCUMENTS

| | | |
|---|---|---|
| DE | 25 18 223 A1 | 11/1976 |
| DE | 3 640 222 A1 | 6/1987 |
| EP | 0 844 110 A2 | 5/1998 |
| EP | 0 853 009 A2 | 7/1998 |
| FR | 2 425 334 | 12/1979 |
| GB | 2 002 699 A | 2/1979 |

OTHER PUBLICATIONS

Clark, Samuel, Ed., Mechanics of Pneumatic Tires, Nov., 1971, Sec. 5.4 (pp. 471–477).
International Search Report: PCT/US99/29366.

* cited by examiner

Primary Examiner—Adrienne C. Johnstone
(74) Attorney, Agent, or Firm—E. Martin Remick; Martin Farrell; Alan A. Csontos

(57) ABSTRACT

A resilient tire that supports a load without internal air pressure includes a ground contacting tread portion and sidewall portions extending radially inward from said tread portion and anchored in bead portions adapted to remain secure to a wheel during rolling of the tire. A reinforced annular band is disposed radially inward of the tread portion. The band comprises an elastomeric shear layer, at least a first membrane adhered to the radially inward extent of the elastomeric shear layer and at least a second membrane adhered to the radially outward extent of the elastomeric shear layer. Each of said membranes has a longitudinal tensile modulus sufficiently greater than the shear modulus of said shear layer so that when under load the ground contacting portion of the tire deforms to a flat contact region through shear strain in the shear layer while maintaining constant the length of the membranes.

29 Claims, 11 Drawing Sheets

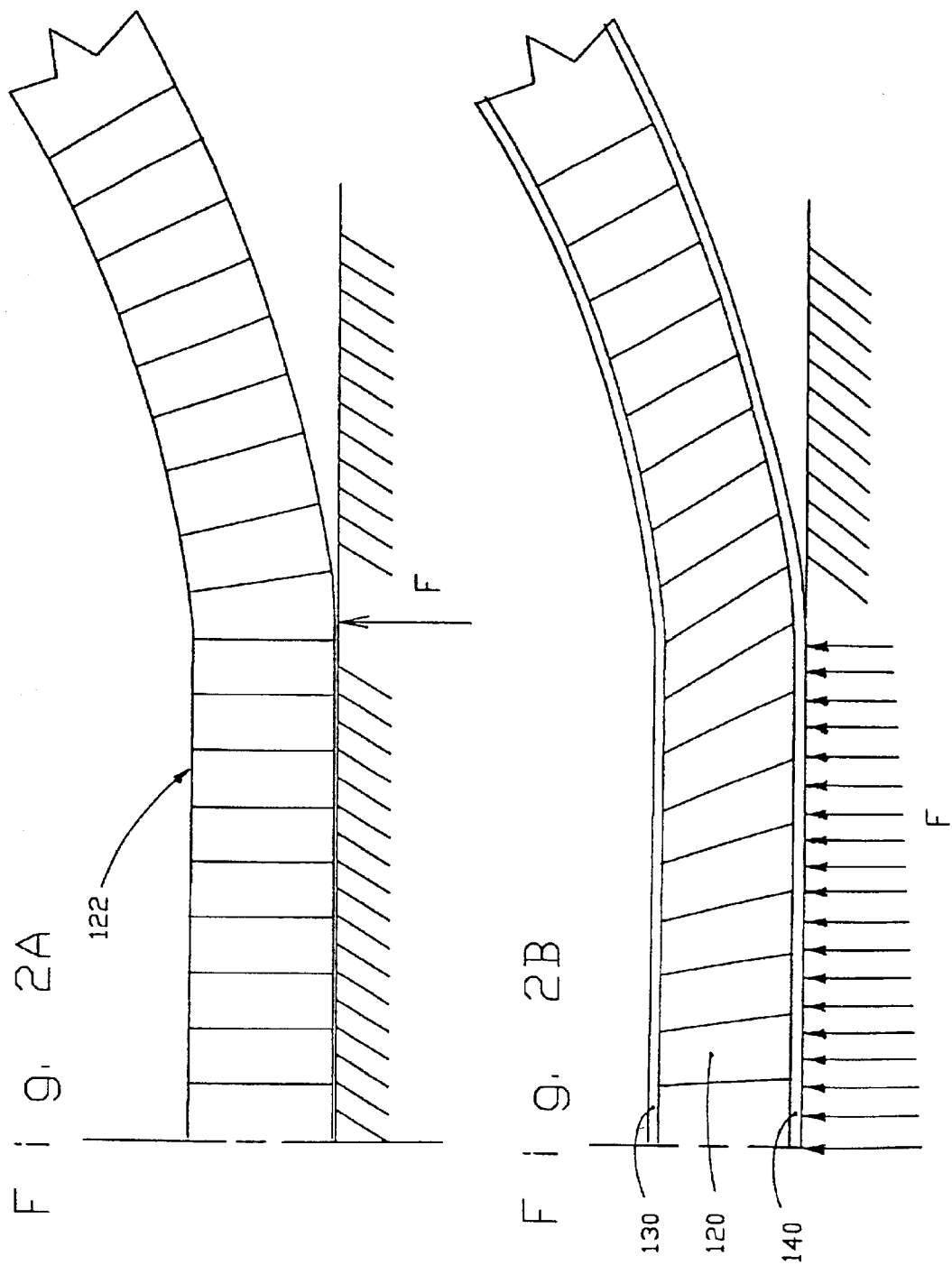

STRUCTURALLY SUPPORTED RESILIENT TIRE

This application claims the benefit of and is a continuation of International Application No. PCT/US99/29366, filed Dec. 10, 1999.

BACKGROUND OF THE INVENTION

The invention relates to a resilient tire capable of supporting a vehicle load by the structural components of the tire without the benefit of internal air pressure.

The pneumatic tire has been the solution of choice for vehicular mobility for over a century. Modem belted, radial carcass pneumatic tires are remarkable products that provide an effective means for supporting applied loads while allowing reasonable vertical and lateral compliance. The pneumatic tire obtains its mechanical attributes largely due to the action of internal air pressure in the tire cavity. Reaction to the inflation pressure provides correct rigidities to the belt and carcass components. Inflation pressure is then one of the most important design parameters for a pneumatic tire. Unfortunately, when inflation pressure is fixed, the designer of a pneumatic tire has limited flexibility to modify the vertical stiffness of the tire.

Good pressure maintenance is required to obtain the best performance from a pneumatic tire. Inflation pressure below that specified can result in a loss of fuel economy. Of primary importance is that a conventional pneumatic tire is capable of very limited use after a complete loss of inflation pressure. Many tire constructions have been proposed for continued mobility of a vehicle after a complete loss of air pressure from the tire. Commercially available runflat tire solutions are pneumatic tires having added sidewall reinforcements or fillers to permit the sidewalls to act in compression as load supporting members during deflated operation. This added reinforcement often results in the disadvantages of higher tire mass and reduced riding comfort. Other attempts to provide runflat capability utilize essentially annular reinforcing bands in the tire crown portion. In these solutions, the rigidity of the tread portion results partly from the inherent properties of the annular reinforcing band and partly from the reaction to inflation pressure. Still other solutions rely on secondary internal support structures attached to the wheel. These supports add mass to the mounted assembly and either increase mounting difficulty or may require the use of multiple piece rims. All of these approaches are hybrids of an otherwise pneumatic tire structure and suffer from design compromises that are optimal for neither the inflated nor deflated states. In addition, these runflat solutions require the use of some means to monitor tire inflation pressure and to inform the vehicle operator if the inflation pressure is outside the recommended limits.

A tire designed to operate without the benefit of inflation pressure eliminates many of the problems and compromises associated with a pneumatic tire. There is only one operating condition, non-inflated. Neither pressure maintenance nor pressure monitoring is required. Structurally supported resilient tires such as solid tires or other elastomeric structures to date have not provided the levels of performance expected from a conventional pneumatic tire. A structurally supported resilient tire solution that delivers pneumatic tire-like performance would be a welcome improvement.

SUMMARY OF THE INVENTION

A structurally supported resilient tire in accordance with the invention supports its load solely through the structural properties of its tread, sidewall and bead portions, and without support from internal air pressure. The tread portion of a structurally supported resilient tire, when viewed without the sidewall and bead portions, appears as a reinforced annular band. The reinforced annular band has rigidities to resist bending in both the tire meridian and equatorial planes. A meridian plane passes through the tire with the axis of rotation lying wholly in the meridian plane. The equatorial plane passes perpendicular to the tire axis of rotation and bisects the tire structure.

The contact of an annular band with a flat plane is analogous to a tire contacting a ground surface. The resultant reactions are analogous to the ground contact stresses of a loaded tire. For a stiff annular band comprised of a homogeneous material, the pressure distribution satisfying the equilibrium and bending moment requirements is made up of a pair of concentrated forces located at each end of the contact area, one end of which is shown in FIG. 2A. In this idealization, no shear deformation of the annular band occurs. However, if the annular band comprises a structure which prescribes shear deformation, the resulting pressure distribution is substantially uniform.

A structurally supported resilient tire in accordance with the invention includes a tread portion, sidewall portions extending radially from the tread portion toward a tire axis, and bead portions at radially inner ends of the sidewall portions to anchor the tire to a wheel. The tread, sidewalls, and beads define a hollow, annular space, similar to that in a pneumatic tire. According to the invention, an annular band is disposed radially inward of the tread portion, the annular band comprising an elastomeric shear layer, at least a first membrane adhered to the radially inward extent of said elastomeric shear layer, and at least a second membrane adhered to the radially outward extent of the elastomeric shear layer. Preferably, the membranes comprise superposed layers of essentially inextensible cord reinforcements embedded in an elastomeric coating layer. The membranes have a longitudinal tensile modulus of elasticity sufficiently greater than the shear modulus of elasticity of the elastomeric shear layer such that, under an externally applied load, the ground contacting tread portion deforms from essentially a circular shape to a flat shape while maintaining an essentially constant length of the membranes. Relative displacement of the membranes occurs by shear in the shear layer.

This effect is schematically represented in FIG. 2B. As shown in FIG. 2B, a beneficial result is a more uniform ground contact pressure throughout the length of the contact area compared to other tires not using an annular band having the deformation properties just described. The annular band does not rely on internal inflation pressure to have a transverse stiffness in a tire meridian plane and a longitudinal bending stiffness in the tire equatorial plane sufficiently high to act as a load-supporting member.

According to one aspect of the invention, a transverse radius of the annular band, that is, the radius of curvature in the tire meridian plane, is less than the transverse radius of the outer tread surface to resist longitudinal buckling of the annular band in the contact area.

The structure according to the invention advantageously allows the tire designer to adjust the vertical stiffness of the tire somewhat independently of the contact pressure. In conventional pneumatic tires, by contrast, the ground contact pressure and tire vertical stiffness are strongly coupled.

The tire sidewalls provide the necessary structure to react at the wheel the load supported by the annular band, thus supporting the mass of a vehicle. In a conventional pneumatic tire, load support is provided by differences in tensions of the tire sidewalls, with the minimum sidewall tension being at the center of the contact area and the maximum being at a meridian opposite the contact area. As shown in FIG. 3a, the structurally supported resilient tire of the present invention supports its load by tensioning the sidewall for those meridians outside the contact area. Optimal load support is obtained when the sidewalls have a high effective radial stiffness in tension and a low effective radial stiffness in compression. When these conditions are satisfied, the wheel can be said to hang from the upper portion of the tire. In addition, for optimal load support, the sidewalls have a rectilinear profile and radially oriented reinforcing elements.

The vertical stiffness of the tire of the invention, which is the resistance under load to deformation in the vertical direction, can be affected to a significant degree by the counterdeflection stiffness of the tire. Counterdeflection stiffness is a measure of the resistance of the tire to deformation of the portion not in ground contact. Counterdeflection of the tire allows some vertical displacement of the wheel axis, which effectively decreases the vertical stiffness of the tire. Adjusting the counterdeflection stiffness of the tire adjusts the vertical stiffness of the tire.

When the tire of the invention rotates at high angular velocity, centripetal forces develop in the annular band. These forces result in circumferential stress, which tends to cause the annular band to expand radially outward. Expansion of the annular band is resisted by the high effective radial stiffness of the sidewalls. Since no such centripetal forces develop in the ground contact area, the net result is a vertically upward force, which acts to support a portion of the imposed load, and increases the effective vertical stiffness of the tire. The centripetal forces, and hence, the effective vertical stiffness of the tire, increase as speed increases; thus, the tire deflection is reduced as speed increases. Reduced deflection reduces heat generation in the tire and improves high-speed performance.

The tensions developed in the sidewalls of the tire of the invention when loaded are significantly lower than the sidewall tensions of an inflated and loaded pneumatic tire. Referring to FIG. 1, the bead portions 160 may employ any of several bead structures which allow proper seating on the rim 10 without relying on inflation pressure and which maintain proper seating of the bead portions during use of the tire. An example of a bead construction meeting these requirements is shown in U.S. Pat. No. 5,785,781 to Drieux et al and is incorporated by reference herein.

According to one embodiment of the invention, a structurally supported resilient tire comprises a ground contacting tread portion, sidewall portions extending radially inward from the tread portion and anchored in bead portions adapted to remain secure to a wheel during rolling of the tire, and a reinforced annular band disposed radially inward of the tread portion, the band comprising an elastomeric shear layer, at least a first membrane adhered to the radially inward extent of the elastomeric shear layer and at least a second membrane adhered to the radially outward extent of the elastomeric shear layer, and in which the second membrane is undulated having an amplitude of undulation in the radial direction and a wavelength of undulation in the axial direction.

This undulated membrane resists compressive buckling of the annular band in the ground contact area without constraints on the transverse radii of the annular band and outer tread surface. If the tread grooves coincide with the minimum of the undulation, that is, the portion of the membrane concave toward the tread, then these grooves can be deeper than the grooves of conventional tires, thus improving hydroplaning resistance of the tire.

According to another embodiment, a structurally supported resilient tire comprises a ground contacting tread portion, sidewall portions extending radially inward from the tread portion and anchored in bead portions adapted to remain secure to a wheel during rolling of the tire, and a reinforced annular band disposed radially inward of the tread portion, the band comprising an elastomeric shear layer, at least a first membrane adhered to the radially inward extent of the elastomeric shear layer and at least a second membrane adhered to the radially outward extent of the elastomeric shear layer, wherein a ratio of the longitudinal stiffness of the band in the tire equatorial plane to an effective radial stiffness of the sidewall portion in tension is less than 100:1.

According to yet another embodiment of the invention, a structurally supported resilient tire comprises a ground contacting tread portion, sidewall portions extending radially inward from the tread portion and anchored in bead portions adapted to remain secure to a wheel during rolling of the tire, and a reinforced annular band disposed radially inward of the tread portion, the band comprising an elastomeric shear layer, at least a first membrane adhered to the radially inward extent of the elastomeric shear layer and at least a second membrane adhered to the radially outward extent of the elastomeric shear layer, wherein the sidewall portions are essentially inextensible in tension and essentially without resistance to compressive buckling, whereby an externally applied load is supported substantially by tensile forces in the sidewall portion in the region of the tire out of contact with the ground and substantially without vertical load support from the sidewall portion in the region in contact with the ground.

According to the invention, a method for making a structurally supported resilient tire with a reinforced annular band having an elastomeric shear layer between longitudinally stiff membranes, comprises the steps of selecting a ground contact pressure and tire radius, multiplying the ground contact pressure by the tire radius to determine a shear layer factor, selecting a shear layer material having a shear modulus of elasticity and with a thickness so that the product of the shear modulus of elasticity times the thickness is equal to the shear layer factor, selecting membranes having a tensile modulus of elasticity at least 100 times the shear modulus of elasticity, and assembling a ground contacting tread portion, the reinforced annular band disposed radially inward of said tread portion, at least a first membrane adhered to the radially inward extent of said elastomeric shear layer and at least a second membrane adhered to the radially outward extent of said elastomeric shear layer, and sidewall portions extending radially inward from said tread portion and anchored in bead portions for securing to a wheel.

BRIEF DESCRIPTION OF THE DRAWINGS

The invention will be better understood through reference to the following description and the appended drawings, in which:

FIG. 2A is a schematic diagram illustrating the ground reaction forces for a reference homogeneous band;

FIG. 2B is a schematic diagram illustrating the ground reaction forces for an annular band of the invention;

DETAILED DESCRIPTION OF THE INVENTION

Figure 1:
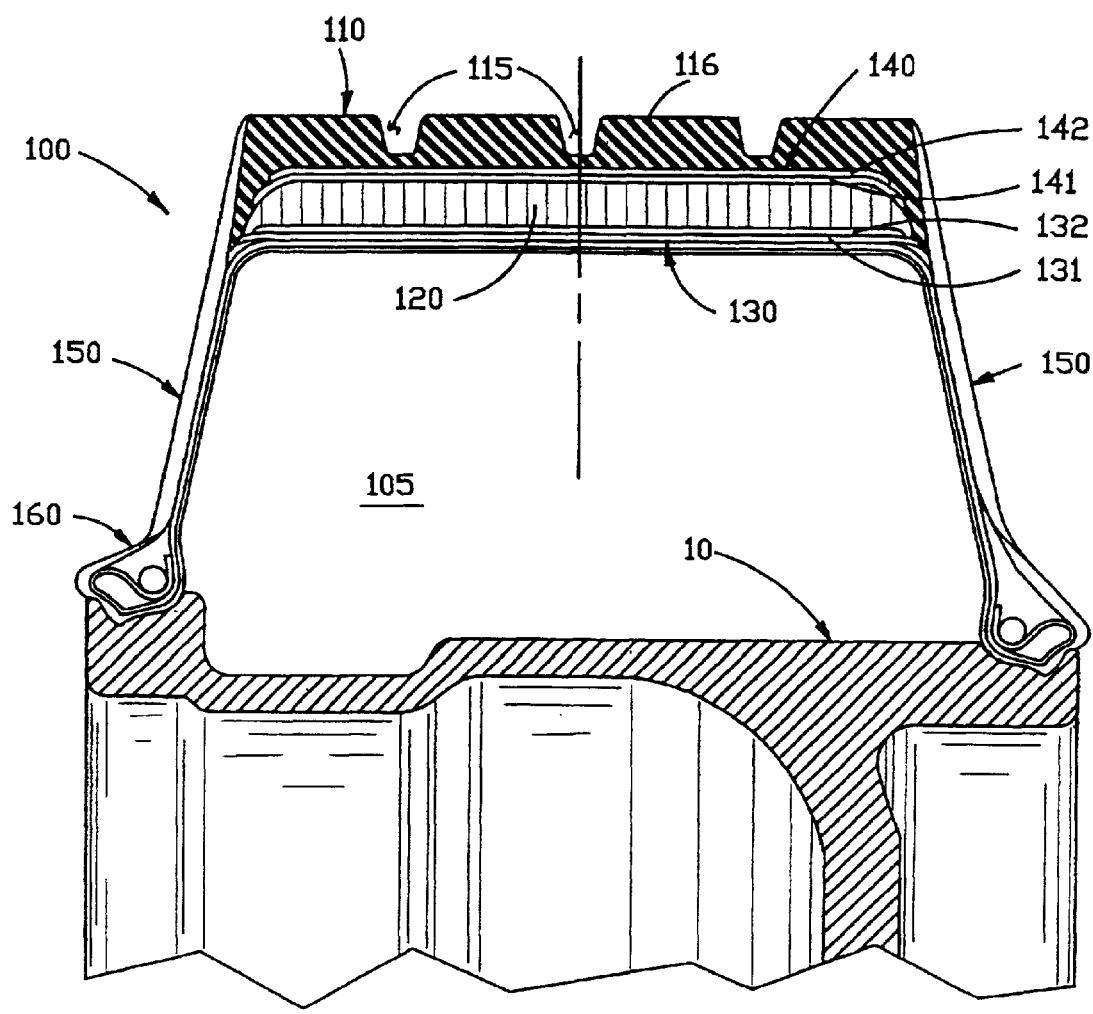
FIG. 1 is a cross section view of a tire of the invention.

The following terms are defined as follows for this description:

"Equatorial Plane" means a plane perpendicular to the axis of rotation of the tire passing through the centerline of the tire.

"Meridian Plane" means a plane parallel to the axis of rotation of the tire and extending radially outward from said axis.

"Modulus" of elastomeric materials means the tensile modulus of elasticity at 10% elongation measured per ASTM Standard Test Method D412.

"Modulus" of the membranes means the tensile modulus of elasticity at 1% elongation in the circumferential direction multiplied by the effective thickness of the membrane. This modulus can be calculated by Equation 1, below, for conventional tire steel belt materials. This modulus is noted with a prime (') designation.

"Shear Modulus" of elastomeric materials means the shear modulus of elasticity and is defined equivalent to one-third the tensile modulus of elasticity measured at 10% elongation.

"Hysteresis" means the dynamic loss tangent measured at 10% dynamic shear strain and at 25° C.

Structurally supported resilient tires in accordance with the present invention are shown in FIGS. 1 and 4, 6, 7, and 8. Structurally supported means that the tire carries a load without the support of gas inflation pressure. The structures disclosed for the several variations of a structurally supported resilient tire utilize similar basic components. Reference numerals depicted in the drawings follow a consistent pattern for each variation.

The tire 100 shown in FIG. 1 has a ground contacting tread portion 110, sidewall portions 150 extending radially inward from the tread portion 110, and bead portions 160 at the end of the sidewall portions. The bead portions 160 anchor the tire 100 to a wheel 10. The tread portion 110, sidewall portions 150, and bead portions 160 define a hollow, annular space 105.

A reinforced annular band is disposed radially inward of tread portion 110. In the embodiment illustrated in FIG. 1, the annular band comprises an elastomeric shear layer 120, a first membrane 130 having reinforced layers 131 and 132 adhered to the radially innermost extent of the elastomeric shear layer 120, and a second membrane 140 having reinforced layers 141 and 142 adhered to the radially outermost extent of the elastomeric shear layer 120.

The tread portion 110 may have no grooves or may have a plurality of longitudinally oriented tread grooves 115 forming essentially longitudinal tread ribs 116 therebetween. Ribs 116 may be further divided transversely or longitudinally to form a tread pattern adapted to the usage requirements of the particular vehicle application. Tread grooves 115 may have any depth consistent with the intended use of the tire. The second membrane 140 is offset radially inward from the bottom of the tread groove a sufficient distance to protect the structure of the second membrane from cuts and small penetrations of the tread portion. The offset distance is increased or decreased depending on the intended use of the tire. For example, a heavy truck tire would commonly use an offset distance of about 5 to 7 mm.

Each of the layers of the first 130 and second 140 membranes comprises essentially inextensible cord reinforcements embedded in an elastomeric coating. For a tire constructed of elastomeric materials, membranes 130 and 140 are adhered to shear layer 120 by the vulcanization of the elastomeric materials. It is within the scope of the invention for membranes 130 and 140 to be adhered to shear layer 120 by any suitable method of chemical or adhesive bonding or mechanical fixation.

The reinforcing elements of layers 131–132 and 141–142 may be any of several materials suitable for use as tire belt reinforcements in conventional tires such as monofilaments or cords of steel, aramid or other high modulus textiles. For the illustrative tires described herein, the reinforcements are steel cords of four wires of 0.28 mm diameter (4×0.28). Although the variations of the invention disclosed herein have cord reinforced layers for each of the membranes, any suitable material may be employed for the membranes which meets the requirements for the tensile stiffness, bending stiffness, and compressive buckling resistance properties required of the annular band. That is to say, the membrane structure may be any of several alternatives such as a homogeneous material, a fiber reinforced matrix, or a layer having discrete reinforcing elements.

In the first membrane 130, layers 131 and 132 have essentially parallel cords oriented at an angle a relative to the tire equatorial plane, and the cords of the respective layers have an opposite orientation. That is, an angle +α in layer 131 and an angle −α in layer 132. Similarly for the second membrane 140, layers 141 and 142 have essentially parallel cords oriented at angles +β and −β, respectively, to the equatorial plane. In these cases, the included angle of the cords between adjacent layers will be twice the specified angle, α or β. Angles α and β will typically be in the range of about 10° to about 45°. It is not required, however, for the cords of the layer pairs in a membrane to be oriented at mutually equal and opposite angles. For example, it may be desirable for the cords of the layer pairs to be asymmetric relative to the tire equatorial plane.

The cords of each of the layers 131, 132 and 141, 142 are embedded in an elastomeric coating layer typically having a shear modulus of about 20 MPa. It is preferred that the shear modulus of the coating layers be greater than the shear modulus of the shear layer 120 to insure that deformation of the annular band is primarily by shear deformation within shear layer 120.

The relationship between the shear modulus G of the elastomeric shear layer 120 and the effective longitudinal tensile modulus $E'_{membrane}$ of the membranes 130 and 140 controls the deformation of the annular band under an applied load. The effective tensile modulus $E'_{membrane}$ of the membrane using conventional tire belt materials can be estimated by the following:

$$E'_{MEMBRANE} = (2D+t)\frac{E_{RUBBER}}{2(1-v^2)}\left[\left(\frac{P}{P-D}\right)\frac{2-(1+v)SIN^2(2\alpha)}{SIN^4\alpha} + \left(\frac{t}{D}\right)\frac{1}{TAN^2\alpha}\left(\frac{1}{TAN^2\alpha} - v\right)\right] \quad (1)$$

Where:
$E_{rubber}$=Tensile modulus of the elastomeric coating material
P=Cord pace (cord centerline spacing) measured perpendicular to the cord direction
D=Cord diameter
v=Poisson's ratio for the elastomeric coating material
α=Cord angle with respect to the equatorial plan
t=Rubber thickness between cables in adjacent layers Note that $E'_{membrane}$ is the elastic modulus of the membrane times the effective thickness of the membrane. When the ratio $E'_{membrane}/G$ is relatively low, deformation of the annular band under load approximates that of the homogeneous band and produces a non-uniform ground contact pressure as shown in FIG. 2a. On the other hand, when the ratio $E'_{membrane}/G$ is sufficiently high, deformation of the annular band under load is essentially by shear deformation of the shear layer with little longitudinal extension or compression of the membranes. Accordingly, ground contact pressure is substantially uniform as in the example shown in FIG. 2B.

According to the invention, the ratio of the longitudinal tensile modulus of the membrane $E'_{membrane}$ to the shear modulus G of the shear layer is at least about 100:1, and preferably at least about 1000:1. For membranes comprising cord reinforced layers using the 4×0.28 cords and the angles disclosed herein, the desired shear modulus of the shear layer 120 is about 3 MPa to about 20 MPa. Repeated deformation of the shear layer 120 during rolling under load causes energy dissipation due to the hysteretic nature of the materials used. The overall heat buildup in the tire is a function of both this energy dissipation and the thickness of the shear layer. Thus, for a given tire design using conventional materials, the hysteresis of the shear layer should be specified to maintain tire operating temperatures below about 130° C. for tires in continuous use.

The tire shown in FIG. 1 has a flat transverse profile for the tread portion 110, first membrane 130 and second membrane 140. The strains in the portion of the annular band in the contact region "C" will be compressive for the second membrane 140, which may be understood by reference to FIG. 3A. As the vertical deflection of the tire increases, the contact length "C" can increase such that the compressive stress in second membrane 140 exceeds the critical buckling stress, and a longitudinal buckling of the membrane occurs. This buckling phenomenon causes a longitudinally extending section of the contact region to have reduced contact pressure. A more uniform ground contact pressure throughout the length of the ground contacting region is obtained when buckling of the membrane is avoided. A membrane having a curved transverse section will better resist buckling in the contact area.

Figure 4:
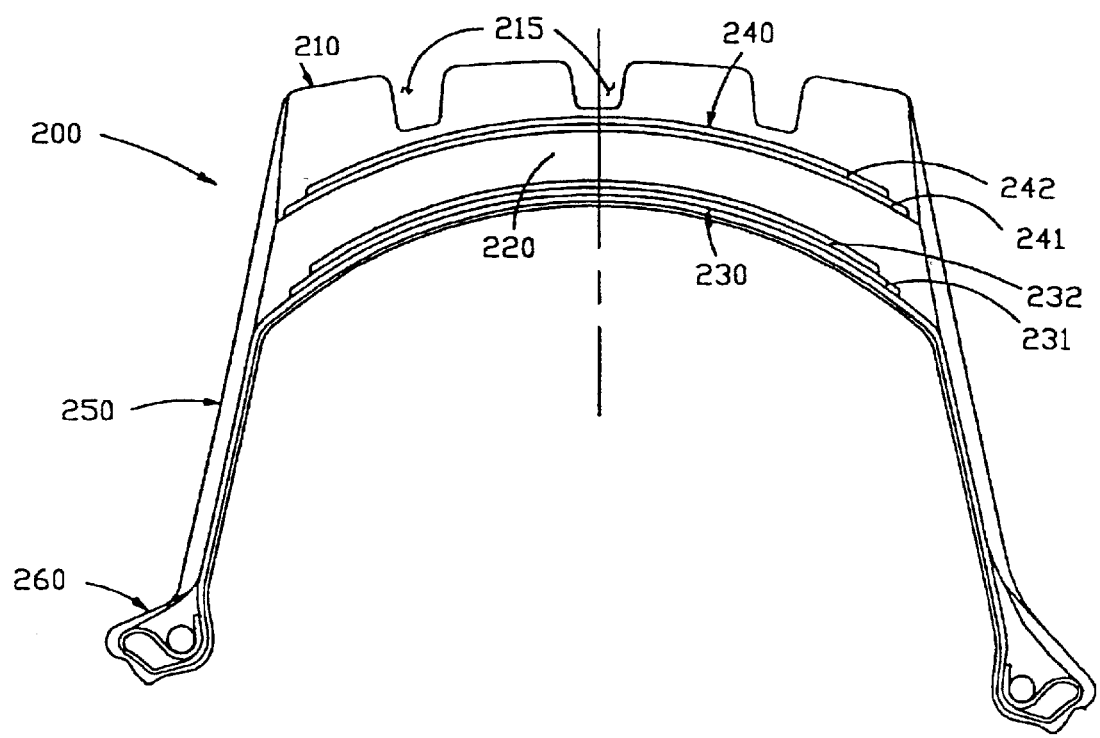
FIG. 4 is a cross section view of a tire according to the invention having arcuate membranes.

In a variation of the invention shown in FIG. 4, tire 200 has an annular band including shear layer 220, first membrane 230, and second membrane 240 having a transverse radius that is less than the transverse radius of the radially outermost surface of the tread portion 210. The curvatures shown in FIG. 4 are exaggerated for the purposes of illustration. Optimization of the contact pressure between the tread surface and the ground for a passenger vehicle tire suggests that the transverse radius of second membrane 240 be at least 500 mm and the transverse radius of the radially outermost surface of the tread portion 210 be at least 1000 mm.

Figure 9:
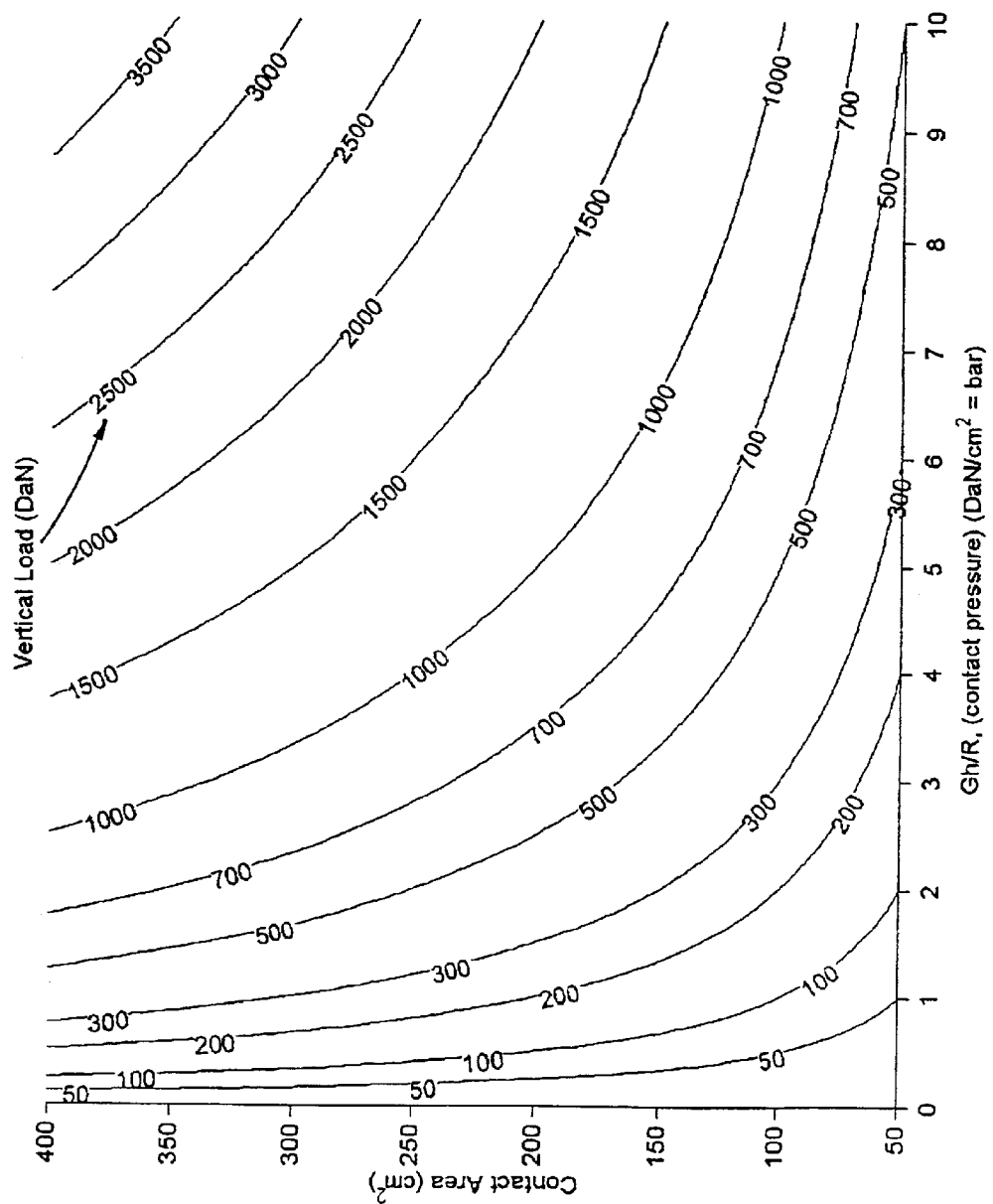
FIG. 9 illustrates graphically the relationship among contact area, contact pressure and vertical load for a tire in accordance with the invention.

When the previously stated conditions for longitudinal tensile modulus $E'_{membrane}$ of the membranes and the shear modulus G of the shear layer are met and the annular band deforms substantially by shear in the shear layer, an advantageous relation is created allowing one to specify the values of shear modulus G and shear layer thickness h for a given application:

$$P_{eff}*R \approx G*h \quad (2)$$

Where $P_{eff}$=Predetermined ground contact pressure
G=Shear modulus of layer 120
h=Thickness of layer 120
R=Radial position of the second membrane $P_{eff}$ and R are design parameters chosen according to the intended use of the tire. Equation (2) then suggests that the product of the shear modulus of elasticity of the shear layer times a radial thickness of said shear layer is approximately equal to a product of a predetermined ground contact pressure times a radial position of the outermost extent of the second membrane. FIG. 9 graphically illustrates this relationship over a broad range of contact pressures and can be used to estimate the shear layer characteristics for many different applications.

The above relation is advantageous to one designing a tire in accordance with the invention. For example, to design a tire intended for passenger car use, the designer may select a design contact pressure $P_{eff}$ of 1.5 to 2.5 DaN/cm$^2$ and a tire size in which the radius R is about 335 mm. By multiplying these values, a "shear layer factor" of 50.25 to 83.75 DaN/cm may be determined, which can be used to specify the shear layer material thickness and shear modulus. In this case, with a shear modulus in the range of about 3 MPa to about 10 MPa, the thickness h of the shear layer is at least 5 mm and preferably is between about 10 mm to about 20 mm.

Figure 3A:
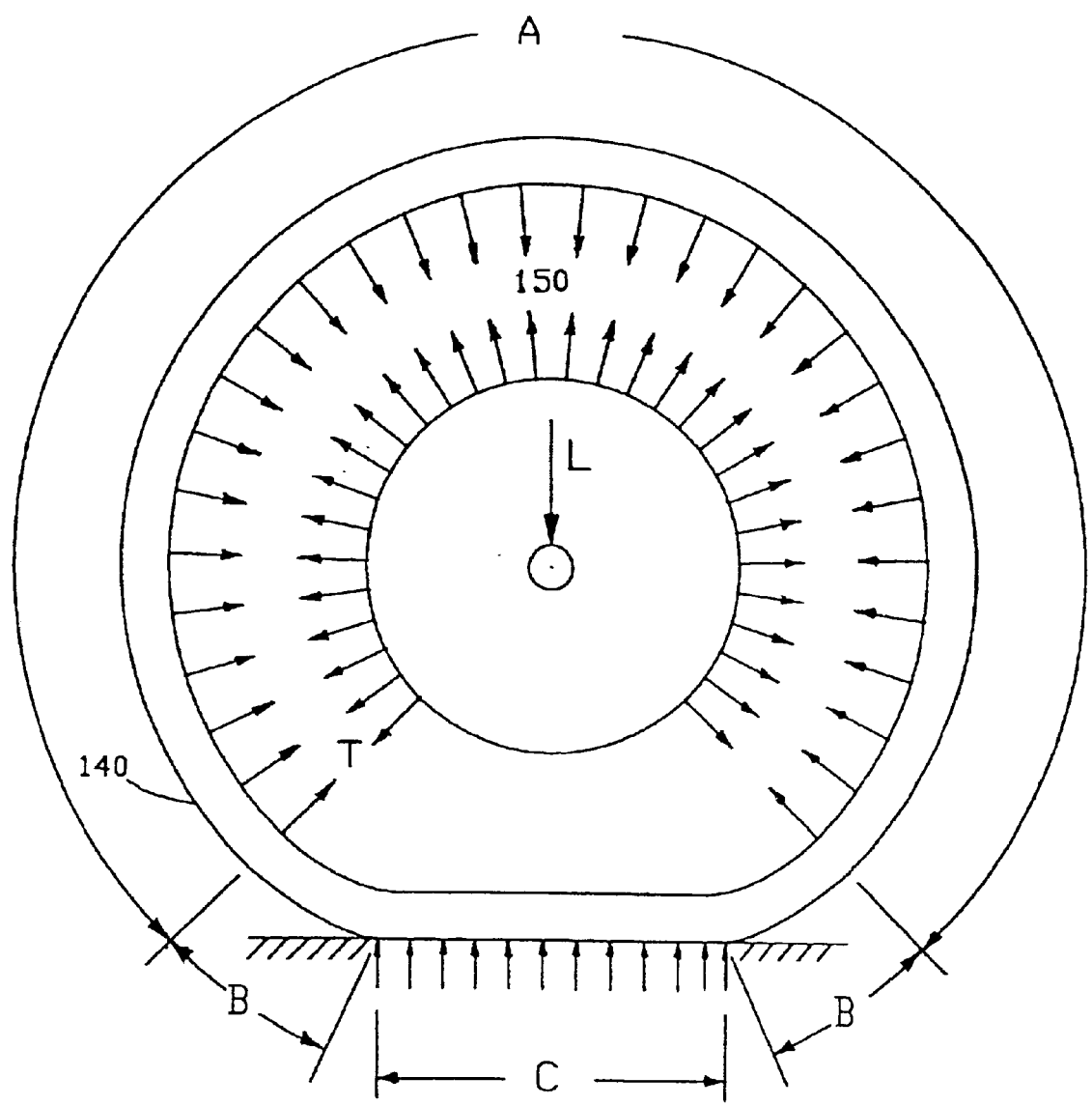
FIG. 3A is a schematic of a loaded tire of the invention showing the load carrying mechanism in the equatorial plane.
Figure 3B:
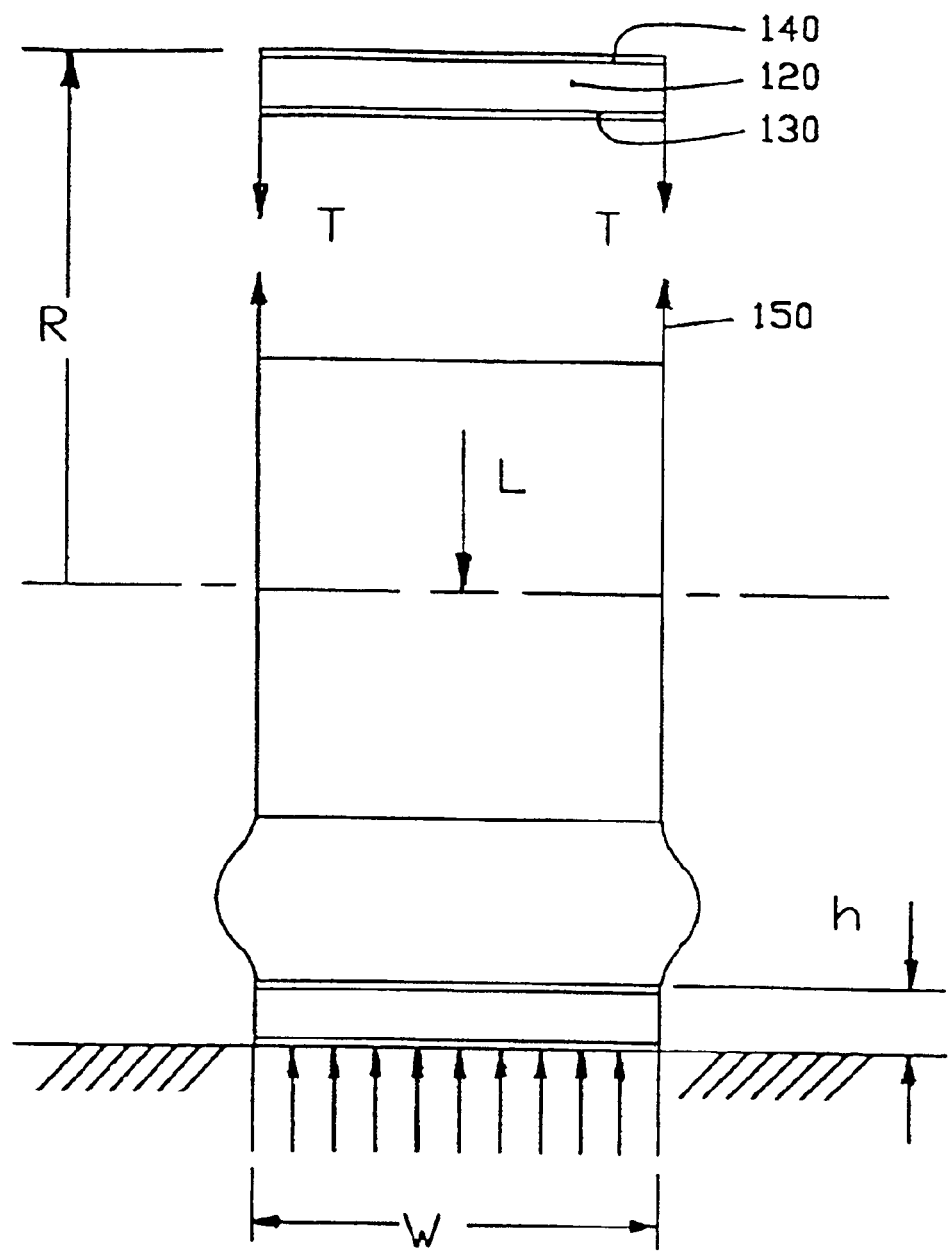
FIG. 3B is a schematic of a loaded tire of the invention showing the load carrying mechanism in the meridian plane.

The tire of the invention supports the applied load in the manner shown in FIGS. 3A and 3B. Carcass elements are under tension T in region "A" and in compression in the contact region B, C. Returning to FIG. 1, a preferred geometry of the sidewall portion 150 is to extend rectilinearly between the tread portion 110 and the bead portions 160 as viewed in the tire meridian plane. The sidewall portions can slope outward from the tread to the rim as in FIG. 1, or inward, as long as they remain rectilinear.

In the tire 100 of FIG. 1, the sidewall portions 150 are reinforced by essentially inextensible cords oriented along the radial direction. The force/elongation characteristics of the sidewall portions 150 are such that tensile forces produce minimal elongation of the sidewall portion, analogous to increasing the tension in a taut string. By comparison, when the curved sidewall of a conventional pneumatic tire is placed under tension in an un-inflated state, the tensile force initially straightens the curve and thus elongates the sidewall. Only after the curved sidewall is straightened does tension increase in the sidewall.

As will be understood by reference to FIGS. 3a and 3b, efficient load support is obtained by having a sidewall portion that has high stiffness in tension but very low stiffness in compression. The tire of the invention has a sidewall portion having an effective radial stiffness in tension sufficiently greater than an effective radial stiffness in compression so that an externally applied load is substantially supported by tensile forces in the region "A" of the sidewall portion 150 out of contact with the ground. Effective radial stiffness of the sidewall portion means the tensile or compressive property associated with the entire radial extent of the sidewall. This could be measured, for example, by removing a sample from the sidewall that maintains the unstressed geometry of the sidewall, and thereafter testing it in a standard tensile testing apparatus. A curved sidewall as is found in a pneumatic tire would have a tensile stiffness that relates to the curvature of the sidewall, and would accordingly, be lower than the tensile stiffness of a sidewall of the tire of the invention, which is essentially straight.

It is preferred that the sidewall portions be essentially inextensible in tension and essentially without resistance to compressive buckling. Under this condition, an externally applied load is supported substantially by tensile forces in said sidewall portion in the region of the tire out of contact with the ground and substantially without vertical load support due to the sidewall portion in the region in contact with the ground.

The sidewall compressive stiffness requirements can be met where the sidewall portion has an axial thickness less than 10% of the radial section height of the tire.

Figure 5A:
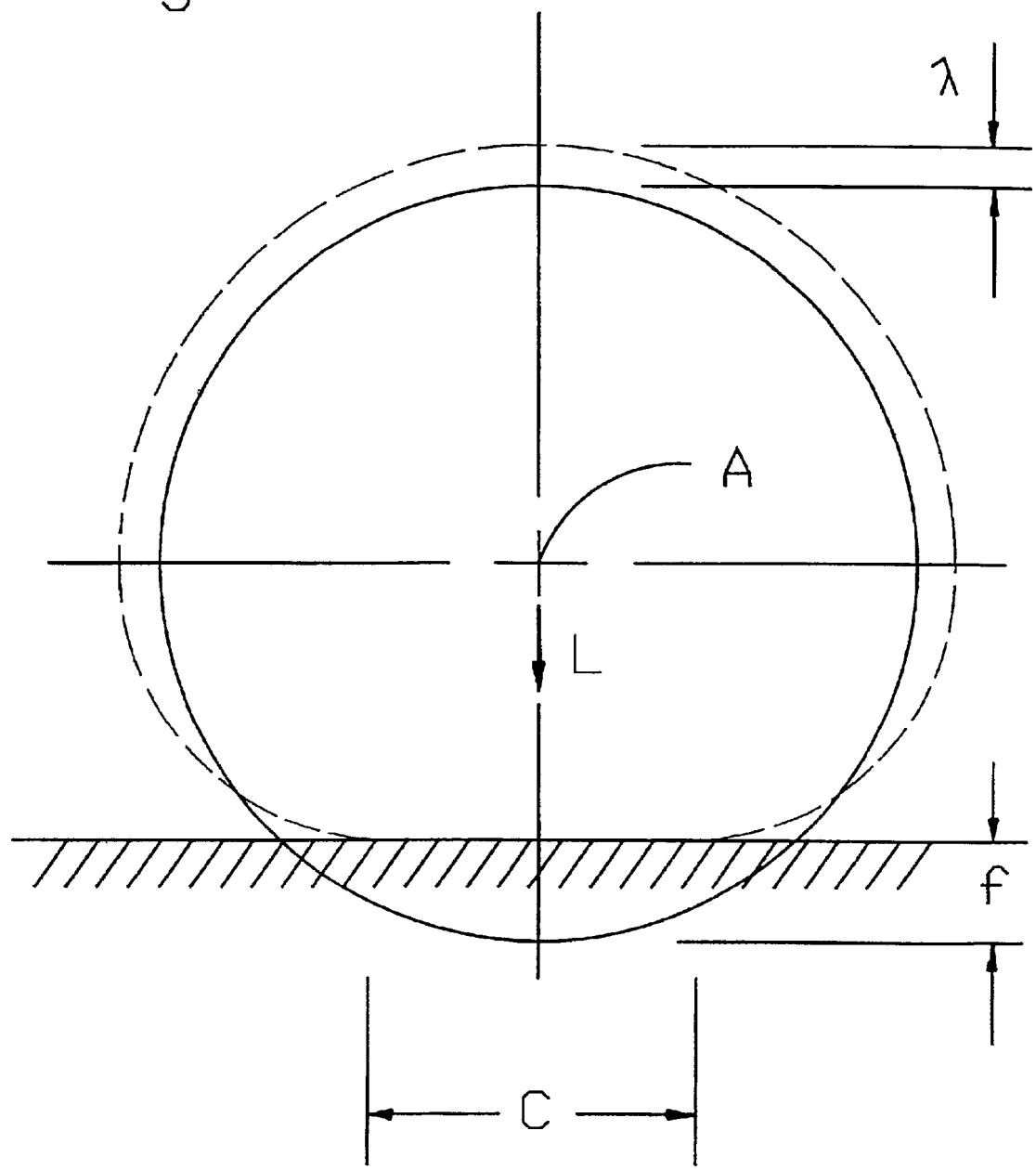
FIG. 5A illustrates counterdeflection stiffness in the tire equatorial plane.
Figure 5B:
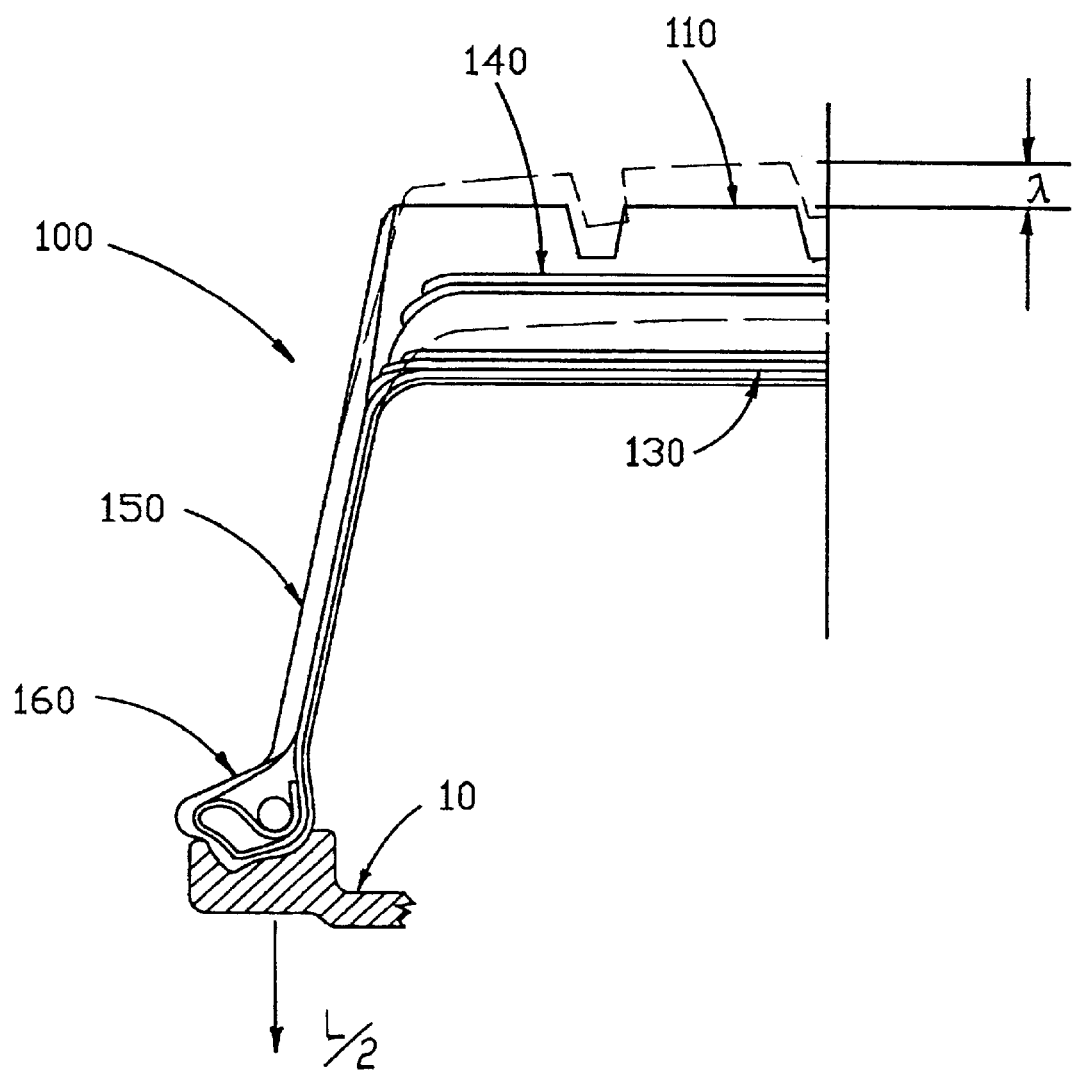
FIG. 5B illustrates counterdeflection stiffness in the tire equatorial plane.

Vertical stiffness relates to the ability of the tire to resist deflection when under load. Vertical stiffness of the tire is strongly influenced by the reaction of the portion of the tire not in contact with the ground, the "counterdeflection" of the tire. FIGS. 5A and 5B illustrate this phenomenon in exaggerated scale. When the tire is under a load L, it deflects an amount f which forms a ground contact area C. Note that for the purposes of this description the frame of reference in FIGS. 5A and 5B maintains the tire axis A at a constant location and moves the ground upward toward the axis. The vertical deflection f is proportional to the load L, from which the vertical stiffness $K_v$ of the tire may be derived. Because the annular band seeks to maintain a constant length, a portion of the tire not in contact shifts, or counterdeflects, away from the contact area C, as indicated by the broken lines in the figures. The counterdeflection amount $\lambda$ is also proportional to the load L, and the counterdeflection stiffness $K_\lambda$ may thus be obtained. Counterdeflection stiffness $K_\lambda$ relates to the way that the tire reinforcing cords not in ground contact are loaded, and should be understood as involving both transverse and circumferential structural interactions.

Counterdeflection can be measured directly by placing a tire under a load F with the axis fixed and measuring both deflection f of the tire in the contact area and the deflection of the tread surface opposite the contact area. Counterdeflection stiffness is then determined by dividing the load F by the counterdeflection amount $\lambda$.

In practice, counterdeflection stiffness $K_\lambda$ substantially controls the vertical stiffness of the tire, and accordingly, the deflection under load of the wheel axis of a tire. Counterdeflection stiffness $K_\lambda$ determines the length of the contact area, as may be seen in FIG. 5A. Low counterdeflection stiffness allows the annular band to move vertically under load, and thus reduces the load capacity at that deflection. Accordingly, a tire having high counterdeflection stiffness has relatively less counterdeflection and a longer contact area, and as a result, can carry a larger load.

Figure 10:
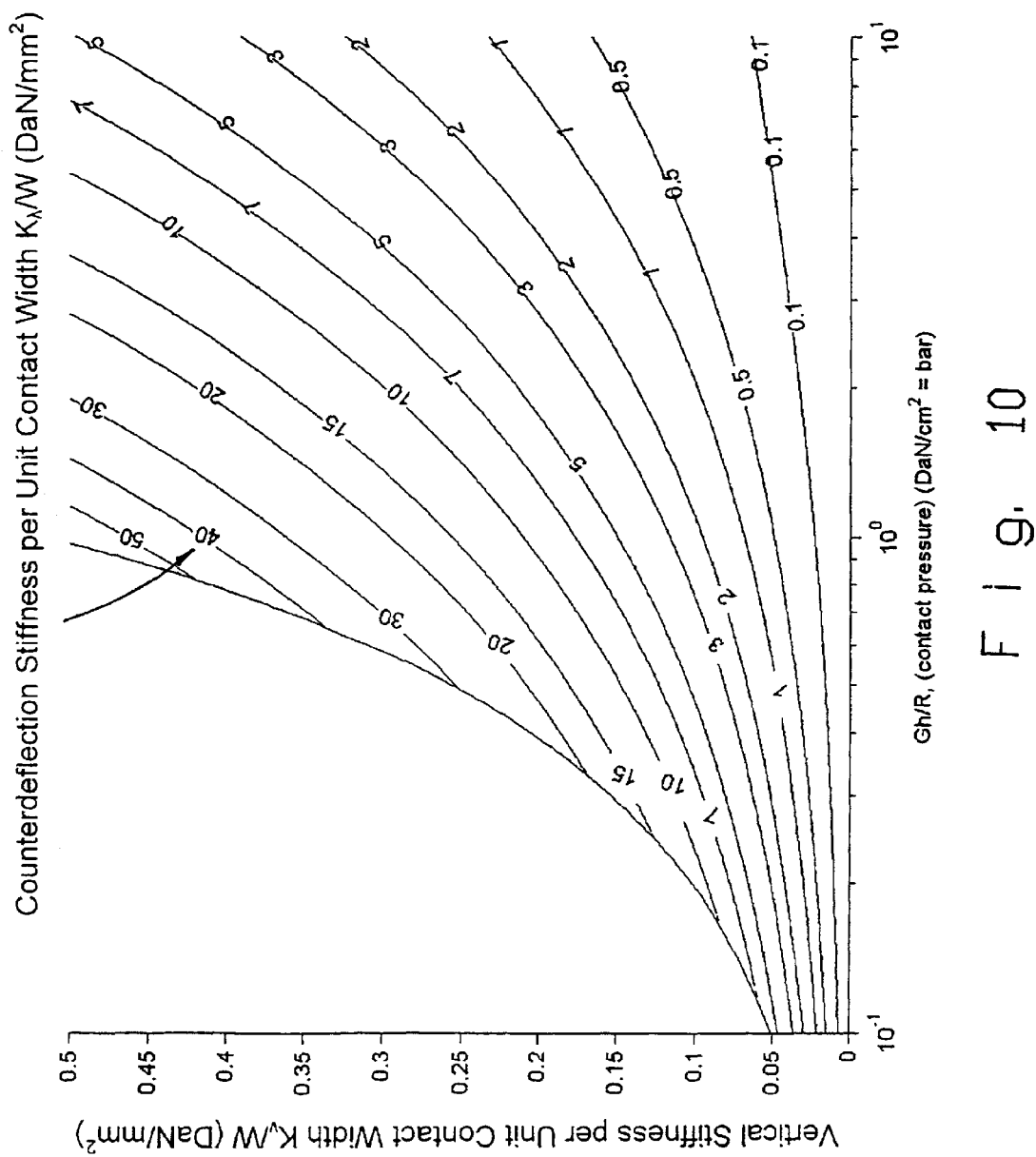
FIG. 10 illustrates graphically the relationship among contact pressure, vertical stiffness, and counterdeflection stiffness for a tire in accordance with the invention.

FIG. 10 shows graphically an approximated relationship of counterdeflection stiffness $K_\lambda$ on the vertical stiffness of the tire. FIG. 10 demonstrates the independence of vertical stiffness and contact pressure available with this invention, which allows design flexibility not available in pneumatic tires. A deflated pneumatic tire has typically a counterdeflection stiffness per unit contact area width of less than 0.1 $DaN/mm^2$. A tire in accordance with the invention, by contrast, can be designed to have a counterdeflection stiffness per unit contact area width ranging above 0.1 $DaN/mm^2$.

Advantageously, the starting design parameters for any proposed application can be selected using FIG. 10 combined with FIG. 9. Once the contact pressure, vertical load, and contact area are selected using FIG. 9, the vertical stiffness characteristics for the tire may be determined using FIG. 10. With an approximate desired value for counterdeflection stiffness $K_\lambda$ obtained from FIG. 10, the designer would then use available analytical tools, finite element analysis, for example, to specify the structure to achieve this stiffness. Further work, including building and testing tires would confirm the design parameters.

Counterdeflection stiffness $K_\lambda$ can be modified in a number of ways. Some of the design parameters used to adjust this stiffness include the carcass cord modulus and density, the sidewall height, the modulus of the elastomeric coating of the carcass cords, the geometry of the coupling between the carcass and the annular band, the modulus of the coupling rubber, the compressive modulus of the annular band membranes, the thickness of the shear layer, the tire diameter, and the width of the annular band.

Vertical stiffness can be adjusted to optimize the load carrying capability of a given tire. Alternatively, vertical stiffness can be adjusted to provide an annular band of reduced thickness for reduced contact pressure or tire mass while maintaining a desired level of vertical stiffness.

The vertical stiffness of the tire of the invention is also influenced by the effect of centripetal forces on the annular band and sidewall portions. As the speed of a rolling tire increases, centripetal forces develop. In conventional radial tires, centripetal forces can increase tire operating temperature. The tire of the invention, in contrast, obtains an unexpected beneficial result from these same forces. When the tire of the invention rotates under an applied load, centripetal forces cause the annular band to tend to expand circumferentially and induce an additional tension in the sidewall portions. The radially stiff sidewalls for the extent of the tire out of contact (region "A" of FIG. 3a) resist these centripetal forces. This produces a net upward resultant force which acts to increase the effective vertical stiffness of tire and to reduce radial deflection of the tire relative to the static, non-rotating condition. This result is obtained to a significant degree when the ratio of the longitudinal stiffness of the band in the tire equatorial plane ($2 \cdot E'_{membrane}$) to the effective stiffness of the sidewall portion in tension is less than 100:1.

Tires designed for passenger car use conforming to the specifications of the tire 200 illustrated in FIG. 4 were reduced to practice using conventional tire building processes and materials. A summary of the results is shown in Table 1.

TABLE 1

Example Tire

| Tire Size | 235 mm section width | Design Parameters |
|---|---|---|
| | 690 mm outside diameter | R = 335 mm |
| | 460 mm seat diameter | G = 3 N/mm$^2$ |
| | | h = 18 mm |
| | | E' membrane = 8750 N/mm |
| | | P effective = Gh/R = 1.6 bar |
| | | K$_\lambda$ = 180 DaN/mm |
| Vertical Stiffness | 17.2 DaN/mm @ 20 mm deflection (secant stiffness) | |
| Cornering Coeff. | 0.26 @ 1 deg. steer | |
| Max Temperature | 112 deg. C. @ 392 DaN load, 80 kph | |
| High Speed Limit | 270 kph @ 294 DaN load | |
| Durability | 40000 km @ 294 DaN load, 50 kph, No Damage | |
| Deflection Reduction | 19% @ 392 DaN load from 40 to 120 kph | |

Subjective evaluation on a 10 point scale (higher = better) comparison with pneumatic tire of the same size

| | Pneumatic 1 | Pneumatic 2 | Invention |
|---|---|---|---|
| Pressure (front/rear) | 1.9/1.8 bar | 1.2/1.2 bar | 0 bar |
| Handling | 6.75 | 6 | 6 |
| Comfort | 5 | 6.25 | 6 |
| Noise | 6 | 6.5 | 6.5 |

In the subjective evaluation, test pneumatic tire 1 was inflated to the recommended cold tire pressure and test pneumatic tire 2 was inflated to a pressure to achieve a vertical stiffness equivalent to the tire made in accordance with the invention.

Tires conforming to the specifications of tire 200 tend to have average values of longitudinal ground contact stresses that are positive, or driving, along the longitudinal centerline of the contact zone and negative, or braking, along the lateral edges of the contact zone. This difference is due to the difference in rolling radius between the centerline and lateral edges of the annular band. A preferred result for tire performance (particularly wear) is obtained when the longitudinal stresses are well equilibrated between the centerline and lateral edges.

Figure 6:
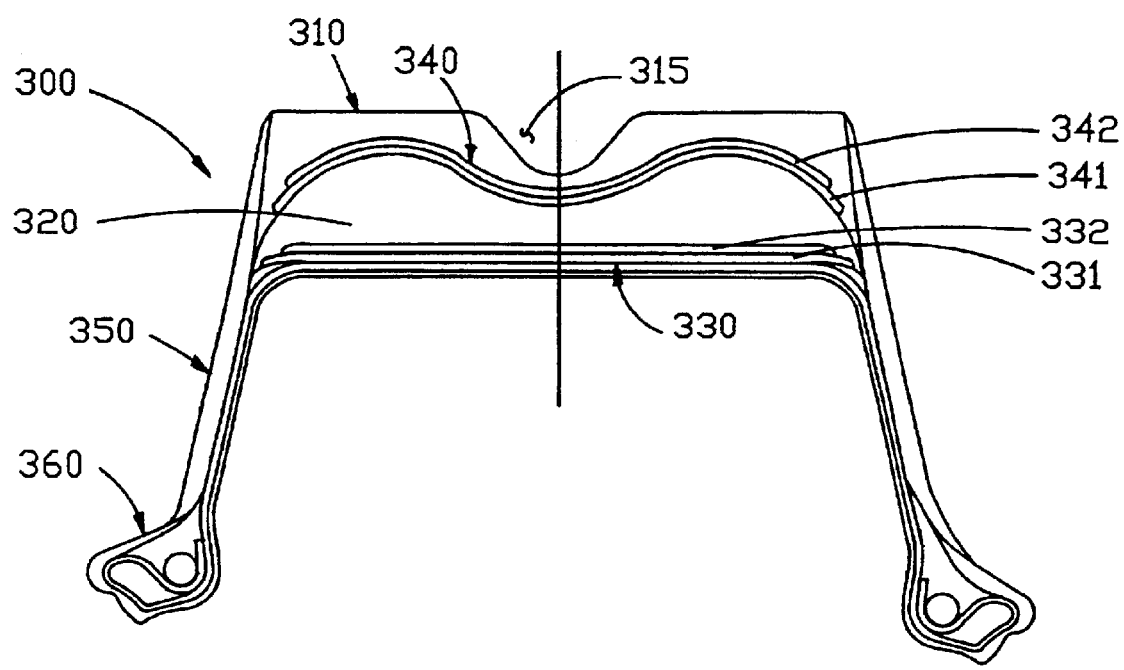
FIG. 6 is a cross section view of a tire in accordance with the invention having an undulated second membrane.

A preferred variation of the invention is shown in FIG. 6 wherein tire 300 has an undulated second membrane having an amplitude of undulation in the radial direction and a wavelength of undulation in the axial direction. The amplitude of undulation is defined as the difference between the maximum and minimum radial extents of the membrane. The wavelength of undulation is defined as the axial distance between successive radial maxima of the membrane. The undulated second membrane resists buckling due to compression in the contact zone like the arcuate membrane of tire 200 of FIG. 4. Deforming said second membrane from essentially a circular shape to a flat shape by an externally applied load occurs without longitudinal buckling of said second membrane and maintains an essentially uniform ground contact pressure of said ground contacting tread portion throughout the length of the ground contacting region. The effectiveness of the undulated membrane to resist buckling is independent of its overall transverse curvature. Thus, it is possible for tire 300 to have a second membrane 340 whose transverse radius of curvature may be specified to optimize ground contact stresses independent of its resistance to buckling. Preferably, second membrane 340 has two to five cycles of undulation, and has a wavelength of undulation of about 20% to about 50% of the rolling tread width of the tread portion 310. The amplitude of undulation is preferably between about 20% and 50% of the maximum shear layer thickness and may be a constant or variable amplitude. Shear layer 320 has an average thickness equal to the constant thickness shear layer specified by Equation (2) for layers 120 and 220 of tires 100 and 200, respectively.

Figure 7:
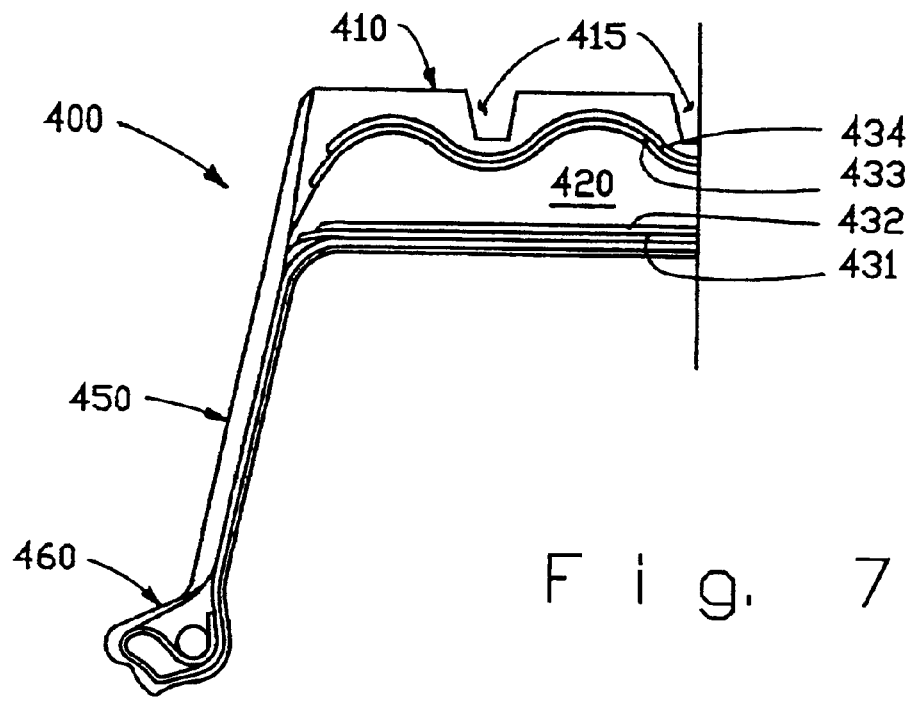
FIG. 7 is a cross section view of a tire of the invention corresponding to a variation of the embodiment shown in FIG. 6.
Figure 8:
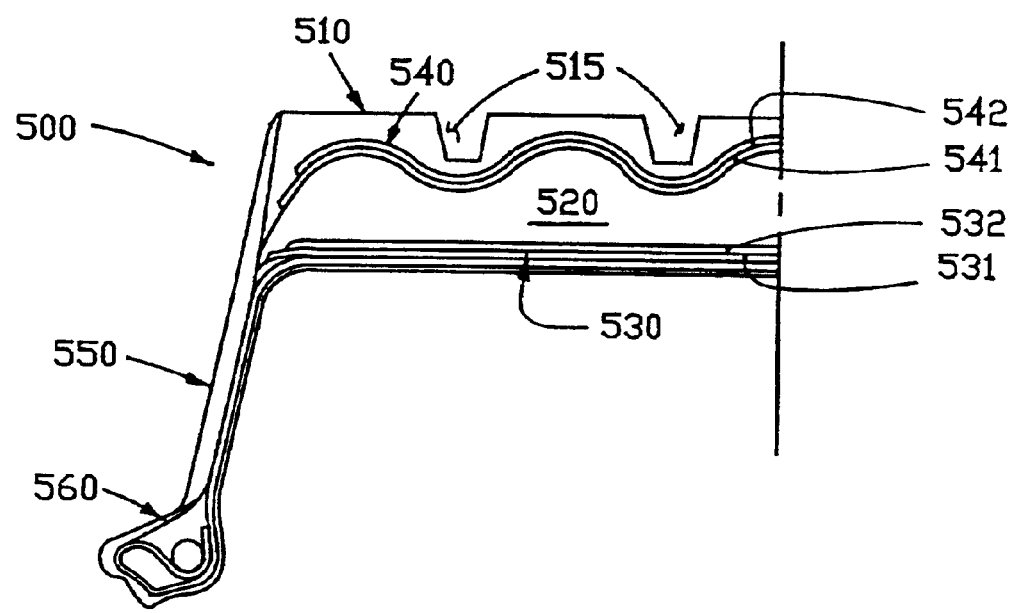
FIG. 8 is a cross section view of a tire of the invention corresponding to another variation of the embodiment shown in FIG. 6.

Variations of the undulated second membrane are shown in FIGS. 6, 7, and 8 wherein the undulated second membrane has respectively two, four or five crests. In these variations the crests are laterally disposed within each tread rib although the number of crests need not be a function of the number of tread ribs nor must the tire have longitudinal ribs. The invention may be equally applied to a slick tire or other rubber article having no grooves. When tire 300 has at least one tread groove 315 disposed radially outward of a minimum of the undulation, the groove can have an increased depth relative to the nominal tread depth of a conventional tire. In this case nominal means a standard tread depth for a particular class of tire as defined by the Tire and Rim Association of Copley, Ohio. In the variations illustrated by tires 300, 400 and 500, the at least one tread groove has a depth of at least 120% of a nominal tread depth.

Applicants understand that many other variations are apparent to one of ordinary skill in the art from a reading of the above specification. These variations and other variations are within the spirit and scope of the instant invention as defined by the following appended claims.

What is claimed:

1. A structurally supported resilient tire comprising a ground contacting tread portion, sidewall portions extending radially inward from said tread portion and anchored in bead portions adapted to remain secure to a wheel during rolling of the tire, and, a reinforced annular band disposed radially inward of said tread portion, wherein said band comprising an elastomeric shear layer, at least a first membrane adhered to the radially inward extent of said elastomeric shear layer and at least a second membrane adhered to the radially outward extent of said elastomeric shear layer, and wherein a ratio of the longitudinal tensile modulus of one of said membranes to the shear modulus of said shear layer is at least 100:1 such that deforming said ground contacting tread portion by an externally applied load from substantially a circular shape to a flat shape maintains a substantially constant length of said membranes and relative displacement of said membranes occurs substantially by shear strain in said shear layer.

2. The tire according to claim 1 wherein the ratio of the longitudinal tensile modulus of one of said membranes to the shear modulus of said shear layer is at least 500:1.

3. The tire according to claim 1 wherein the ratio of the longitudinal tensile modulus of one of said membranes to the shear modulus of said shear layer is at least 1000:1.

4. The tire according to claim 1 wherein the counterdeflection stiffness per unit contact width is greater than 0.1 DaN/mm$^2$.

5. The tire according to claim 1 wherein a product of said shear modulus of elasticity of said shear layer times a radial thickness of said shear layer is approximately equal to a product of a predetermined ground contact pressure times a predetermined radius radial position of the outermost extent of said tread portion second membrane.

6. The tire according to claim 5 wherein said shear layer has a radial thickness of at least 5 mm.

7. The tire according to claim 6 wherein said shear layer has a radial thickness of about 10 mm to about 20 mm.

8. The tire according to claim 1 wherein said elastomeric shear layer has a shear modulus of elasticity of about 3 MPa to about 20 MPa.

9. The tire according to claim 1 wherein each of said at least first and second membranes further comprise layers of substantially inextensible cord reinforcements embedded in an elastomeric coating layer having a shear modulus of elasticity greater than or equal to at least the shear modulus of elasticity of said shear layer.

10. The tire according to claim 9 wherein the cord reinforcements of said first and second membranes form an angle with the tire circumferential direction of between about 10° and 45°.

11. The tire according to claim 1 wherein said second membrane has an arcuate transverse profile having a transverse radius of curvature less than a transverse radius of curvature of a radially outermost surface of said tread portion.

12. The tire according to claim 11 wherein said radially outermost surface of said tread portion has a transverse radius of curvature of at least 1000 mm.

13. The tire according to claim 11 wherein said second membrane has a transverse radius of curvature of at least 500 mm.

14. The tire according to claim 1 wherein said tread portion has at least one tread groove.

15. The tire according to claim 1 wherein said second membrane is undulated having an amplitude of undulation in the radial direction and a wavelength of undulation in the axial direction.

16. The tire according to claim 15 wherein the amplitude of undulation of said second membrane is between about 20% and 50% of the maximum thickness of said shear layer.

17. The tire according to claim 15 wherein said second membrane has a constant amplitude within the axial extent of said membrane.

18. The tire according to claim 15 wherein said second membrane has a wavelength of undulation between about 20% and 50% of the rolling tread width of said tread portion.

19. The tire according to claim 15 wherein said tread portion has at least one groove having a tread depth of at least 120% of a nominal tread depth.

20. The tire according to claim 1 wherein said sidewall portion has an effective radial stiffness in tension greater than an effective radial stiffness in compression.

21. The tire according to claim 20 wherein said sidewall portions are substantially inextensible in tension and substantially without resistance to compressive buckling.

22. The tire according to claim 20 wherein said sidewall portions are reinforced by substantially radial elements.

23. The tire according to claim 20 where said sidewall portions are rectilinear in the tire meridian plane.

24. The tire according to claim 20 wherein said sidewall portion has a maximum thickness less than 10% of the radial section height of said tire.

25. The tire according to claim 1 wherein a ratio of said longitudinal stiffness of said annular band in the tire equatorial plane to an effective radial stiffness of said sidewall portion in tension is less than 100:1.

26. A structurally supported resilient tire comprising a ground contacting tread portion, sidewall portions extending radially inward from said tread portion and anchored in bead portions adapted to remain secure to a wheel during rolling of the tire, and, a reinforced annular band disposed radially inward of said tread portion, said band comprising an elastomeric shear layer, at least a first membrane adhered to the radially inward extent of said elastomeric shear layer and at least a second membrane adhered to the radially outward extent of said elastomeric shear layer, and said second membrane is undulated having amplitude of undulation in the radial direction and a wavelength of undulation in the axial direction, whereby deforming said second membrane from substantially a circular shape to a flat shape by an externally applied load occurs without longitudinal buckling of said second membrane and maintains a substantially uniform ground contact pressure of said ground contacting tread portion throughout the length of the ground contacting region.

27. A structurally supported resilient tire comprising a ground contacting tread portion, sidewall portions extending radially inward from said tread portion and anchored in bead portions adapted to remain secure to a wheel during rolling of the tire, and, a reinforced annular band disposed radially inward of said tread portion, said band comprising an elastomeric shear layer, at least a first membrane adhered to the radially inward extent of said elastomeric shear layer and at least a second membrane adhered to the radially outward extent of said elastomeric shear layer, and a ratio of said longitudinal stiffness of said annular band in the tire equatorial plane to an effective radial stiffness of said sidewall portion in tension is less than 100:1, whereby rotation of said tire under applied load causes a circumferential expansion of said annular band and induces an additional tension in said sidewall portions and reduces the radial deflection of said tire relative to the non-rotating condition.

28. A structurally supported resilient tire comprising a ground contacting tread portion, sidewall portions extending radially inward from said tread portion and anchored in bead portions adapted to remain secure to a wheel during rolling of the tire, and said tread portion having, a reinforced annular band disposed radially inward of said tread portion, said band comprising an elastomeric shear layer, at least a first membrane adhered to the radially inward extent of said elastomeric shear layer and at least a second membrane adhered to the radially outward extent of said elastomeric shear layer, and wherein said sidewall portions are substantially inextensible in tension and substantially without resistance to compressive buckling, whereby an externally applied load is supported substantially by tensile forces in said sidewall portion in the region of the tire out of contact with the ground and substantially without vertical load support due to the sidewall portion in the region in contact with the ground.

29. A method for making a structurally supported resilient tire with a reinforced annular band having an elastomeric shear layer between longitudinally stiff members, comprising the steps of:

selecting a ground contact pressure and tire radius;

multiplying the ground contact pressure by the tire radius to determine a shear layer factor;

selecting a shear layer material having a shear modulus of elasticity and with a thickness so that the product of the shear modulus of elasticity times the thickness is equal to the shear layer factor;

selecting membranes having a tensile modulus of elasticity at least 100 times the shear modulus of elasticity, and;

assembling a ground contacting tread portion, said reinforced annular band disposed radially inward of said tread portion, at least a first membrane adhered to the radially inward extent of said elastomeric shear layer and at least a second membrane adhered to the radially outward extent of said elastomeric shear layer, and sidewall portions extending to radially inward from said tread portion and anchored in bead portions for securing to a wheel.

* * * * *